US012265817B1

(12) United States Patent
Miroshkin et al.

(10) Patent No.: US 12,265,817 B1
(45) Date of Patent: Apr. 1, 2025

(54) SYSTEM AND METHOD FOR AUTOMATIC UPDATING OF AN APPLICATION IN A COMPUTING SYSTEM

(71) Applicant: Acronis International GmbH, Schaffhausen (CH)

(72) Inventors: Vladimir Miroshkin, Sofia (BG); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 81 days.

(21) Appl. No.: 18/067,021

(22) Filed: Dec. 16, 2022

(51) Int. Cl.
    G06F 9/44 (2018.01)
    G06F 8/65 (2018.01)
    G06F 9/445 (2018.01)
    G06F 9/455 (2018.01)

(52) U.S. Cl.
    CPC ..................... G06F 8/65 (2013.01)

(58) Field of Classification Search
    CPC ........................................................ G06F 8/65
    See application file for complete search history.

(56) References Cited

U.S. PATENT DOCUMENTS

| | | |
|---|---|---|
| 7,613,804 B2 | 11/2009 | Raden et al. |
| 9,170,852 B2 | 10/2015 | Thompson et al. |
| 10,331,428 B1 | 6/2019 | Zalpuri et al. |
| 10,684,840 B1 * | 6/2020 | Hussain ............... H04L 67/30 |
| 11,023,133 B2 | 6/2021 | Beloussov et al. |
| 11,102,330 B2 | 8/2021 | Gardner et al. |
| 11,349,959 B1 * | 5/2022 | Lee ....................... H04L 41/082 |
| 11,768,672 B1 * | 9/2023 | Silakov ..................... G06F 8/65 717/172 |
| 2022/0004378 A1 * | 1/2022 | Thomas ................... G06F 8/65 |

(Continued)

FOREIGN PATENT DOCUMENTS

| | | | |
|---|---|---|---|
| CN | 107943496 A | | 4/2018 |
| CN | 114416755 A | * | 4/2022 |

OTHER PUBLICATIONS

Konstantinos Arakadakis, Firmware over-the-air programming techniques for IoT networks—A survey, 2020, pp. 1-21. chrome-extension://efaidnbmnnnibpcajpcglclefindmkaj/https://arxiv.org/pdf/2009.02260 (Year: 2020).*

(Continued)

*Primary Examiner* — Mongbao Nguyen
(74) *Attorney, Agent, or Firm* — ESPE Legal Consultancy FZ-LLC

(57) ABSTRACT

A system and method implemented for installing sequential automatic updates partially distributed in a computing environment. The system includes an update server to identify a first group of nodes having applications that require updates. An update task manager sends an update task to an update agent installed at each node of a first group of the nodes. The update agent determines availability of each software component of a software application that requires the update. If the software components are ready, the update is delivered by uninstalling a previous version and installing the updated version at the software components. During the update installation, progress of the update is monitored, and completion of the update is reported to the nodes. Update availability is monitored, and emergency updates are delivered forcefully if available.

20 Claims, 3 Drawing Sheets

(56) References Cited

U.S. PATENT DOCUMENTS

| | | | |
|---|---|---|---|
| 2022/0100573 A1* | 3/2022 | Allen | G06F 9/5038 |
| 2022/0206783 A1* | 6/2022 | Silakov | G06F 11/3409 |
| 2022/0210288 A1 | 6/2022 | Tsuji et al. | |
| 2022/0350628 A1* | 11/2022 | Parry-Barwick | G06F 9/44505 |
| 2022/0350629 A1* | 11/2022 | Parry-Barwick | G06F 8/65 |
| 2023/0103766 A1* | 4/2023 | Agarwal | G06F 8/658 |
| | | | 717/168 |
| 2023/0185560 A1* | 6/2023 | Takumi | G06F 8/70 |
| | | | 717/170 |
| 2023/0305876 A1* | 9/2023 | Sharma | G06F 11/0793 |
| 2024/0118905 A1* | 4/2024 | Kondiles | G06F 9/442 |

OTHER PUBLICATIONS

Marvin Fleischmann, The role of software updates in information systems continuance—An experimental study from a user perspective, 2016, pp. 1-14. https://www.sciencedirect.com/science/article/pii/S0167923616000026 (Year: 2016).*

English translation, Zhang (CN 114416755 A), 2022, pp. 1-22. (Year: 2022).*

* cited by examiner

SYSTEM AND METHOD FOR AUTOMATIC UPDATING OF AN APPLICATION IN A COMPUTING SYSTEM

FIELD OF THE INVENTION

The present disclosure generally relates to software updates. In particular, the present disclosure relates to a system and method for auto-updating software components of an application implemented within a computing system.

BACKGROUND OF THE INVENTION

Updates are improvements in software components of an application to facilitate operational efficiency and effectiveness of the application. Software updates are necessary to keep computers, mobile devices and tablets running smoothly, and to exclude the security vulnerabilities. While threat actors continue to come up with new methods to attack, steal information, and gain access to systems, there are some simple, preventative measures to help stop them. Updating software provides one such layer of protection. The update may be generated to patch security flaws, get new features, protect data, improve performance, and ensure compatibility.

Security vulnerabilities, such as data breaches, hacks, cyber-attacks, identity thefts and the like have been evolving continuously. With methods developed to defend the computing system against such vulnerabilities, it is important to keep the software applications updated with every new version. With the automatic updates feature, a user can automatically keep the computer up to date with the latest updates and enhancements. The user may not have to search for critical updates and information.

Automatic updates installation, however, becomes difficult when the applications are installed at distributed systems providing various computer services to clients by a collection of nodes/servers, such as arranged as clusters, and a subset of components or program modules are running on dedicated computer nodes. Due to its distributed nature, a host computing system may lose connection with the user computing system for various reasons, including erroneous events or a system failure caused by an update. It may be a difficult task to keep the software up to date with the latest fixes and software improvements without disrupting the services offered by the distributed systems, or in situations where it is no longer possible to deliver the updates.

Therefore, there is a need for a system to deploy automatic updates on the application implemented in a computing system that can render a reliable installation of updates and in case of failure, rollback to previous stable version.

SUMMARY OF THE INVENTION

The present disclosure relates to a system and method for auto-updating software components of an application implemented within a computing system. The present method involves reliable and robust automatic installation of the updates on the applications implemented on the computing system, and rollback the update to the previous stable version in case of the update failure.

In some embodiments, the method for updating the software applications is implemented via a primary update delivery channel.

The method mainly relates to a step of updating a plurality of applications in a computing environment implemented by an update engine. The method comprises a step of identifying, by an update server, a first group of nodes from all nodes, corresponding to the plurality of applications that require software update. A number of nodes of the first group of nodes defines a predefined percent of all nodes. The method further comprises a step of sending, by an update task manager, an update task to an update agent installed at each node of the first group of nodes. The method comprises a step of updating the software components of each node from the first group of nodes that further comprises steps of receiving the update task by the update agent; sending an update request to all software components by the update agent; collecting notification from the software components the readiness to update by the update agent; if the notification is obtained from a predefined quorum of the first group of nodes, updating the software components by uninstalling previous version and installing a new version of the software; and sending a completion status of update task completeness by the update agent to the update task manager.

The method further comprises a step of collecting the status of the update task from the first group of nodes determining if the update is completed successfully for the first group of nodes or not; and determining a number of nodes failed to complete the update task, if the number of failed nodes doesn't exceed a predefined threshold value, determining a second group of nodes to send the update task, and if the number of failed nodes exceed the predefined threshold value, terminating the update task.

In some embodiments, the method comprises implementing a secondary update delivery channel for periodically sending a secondary update request to the nodes, which are not responding to the primary update request, to initiate the update tasks, and implementing a backup update delivery channel for delivering critical updates to the nodes.

In some embodiments, the method comprises distributing an update installation task among all nodes and calculating an error factor, wherein the update task is identified as invalid if the error factor exceeds an error threshold value and health attributes associated with the nodes are eliminated.

In some embodiments, the step of updating software comprises sequential automatic updating of the applications with partial distribution of the application.

In some embodiments, the method comprises, if the connection from the update server to the at least one node is lost due to an update issue, steps of activating a connection from at least one node after predefined time period and receiving, from the update server, instructions to resolve a problem that caused the connection failure.

In some embodiments, the method comprises re-attempting the step of updating software after predetermined duration and for predetermined number of attempts, if the step of updating software fails in a first attempt, wherein the duration and predetermined number of attempts are a configurable parameter.

In some embodiments, the method comprises controlling the number of applications being updated at specific instance; configuring a maximum number of applications that can be updated; inspecting a health status of update procedure by tracking a number of applications with update failure, and a number of applications with health status failure; restricting a counter of applications with update failure in response to update completion of the applications; defining an application update a failure ratio by $Nf/max(N0, N)$, where N is total number applications that had attempts to update them to the new version for particular installer that completed so far; $Nf$ is number of applications that failed to update (installation or post-installation health-check failure); N0 is a positive integer value; terminating automatic installation of the update if the failure ratio exceeds a failure ratio threshold.

In some embodiments, the method comprises resuming the step of updating the application, if halted, after investigating and rectifying an error that caused the halt; removing at least one application, from the first group of nodes, having disabled the auto-update feature; creating a list of applications having disabled auto-update feature, wherein a user of the application having disabled auto-update feature receives a notification; and enabling a decision-making component to instruct defensive cyberspace operations (DCO) to determine if the list should be reset or not.

In some embodiments, the method comprises reporting a progress of the update task; displaying the progress of the update task on the node corresponding to the application in percentage of the task completion; displaying the progress in stages including pending current activities completion, downloading of the required packages associated with the update task, and installing the required packages.

In some embodiments, the method comprises implementing an emergency backup mode in response to failure to receive health-check status from the application; configuring the update controller to monitor availability of the emergency update with predetermined time interval; if the emergency update is available, initiating forced update installation on the application; and repairing the applications and reinstalling all software components associated with the application by the forced update.

In some embodiments, a system updates a plurality of applications in a computing environment. The system is implemented by a primary update delivery channel and comprises an update server, an update task manager, and an update agent.

In one embodiment, the system is implemented by an update engine to update a plurality of applications in a computing environment. The system comprises an update server to identify a first group of nodes from all nodes, corresponding to the plurality of applications that require software update, wherein a number of nodes of the first group of nodes is a predefined percent of all nodes.

In one embodiment, the system comprises an update task manager configured to send an update task to an update agent installed at each node of the first group of nodes.

In one embodiment, the update agent is configured to receive the update task from the update task manager, to send an update request to all software components of each application, to send an update task to the first group of nodes, and to collect a notification from all the software components ensuring the readiness of all the software components to initiate updating. If the notification is obtained from a predefined quorum of the first group of nodes, software components of the application are updated by uninstalling previous version and installing a new version of the software. An update task completion status is sent to the update task manager.

In one embodiment, the update task manager is configured to collect the status of the update task from the update agent and determine a number of nodes that failed to complete the update task. If the number of failed nodes doesn't exceed a predefined threshold value, the update server is configured to determine a second group of nodes to send the update task. If the number of failed nodes exceeds the predefined threshold value, the update task manager is configured to terminate the update task.

DETAILED DESCRIPTION

A system and method are disclosed that provides sequential automatic updates of an application with partial distribution of nodes hosting the applications and installation of the update after all internal processes and tasks currently running on the nodes are completed and checks relating to update delivery and installation are successfully done on the node.

A computing environment comprises an environment that involves the collection of computer machinery, data storage devices, workstations, software applications, and networks that support the processing and exchange of electronic information demanded by the software solution Nodes comprise a physical connection point among devices connected in a network, such as personal computers, laptops, mobile phones, routers, printers, and switches. The nodes receive and send data from one endpoint to the other.

Hosts comprise a computer or other device that communicates with other devices on a network, including other hosts. A host may include clients and servers that can send or receive data, services, or applications. A host may work as a server offering information resources, services, and applications to users or other hosts on the network. Hosts are assigned at least one Internet Protocol (IP) address.

A software update comprises a release of a newer version of software components, in object code form, or firmware, which provides minor fixes, improvements and modifications to the software or equipment. In some cases, updates comprise upgrades to an application when that application is replaced with a newer version of the same application.

System users comprise individuals who log onto the system to access the blockchain. Typically, the user may be required to be authorized and authenticated in order to access the system. Accordingly, in some embodiments, the user may be an employee of the entity, such as an administrator.

Each of the disclosed computing systems may be implemented with single or multiple computing systems. For example, in some embodiments, a given computing system may represent multiple systems configured to operate in a distributed fashion. In other embodiments, the functions of multiple computing systems may be accomplished by a single system.

Figure 1:
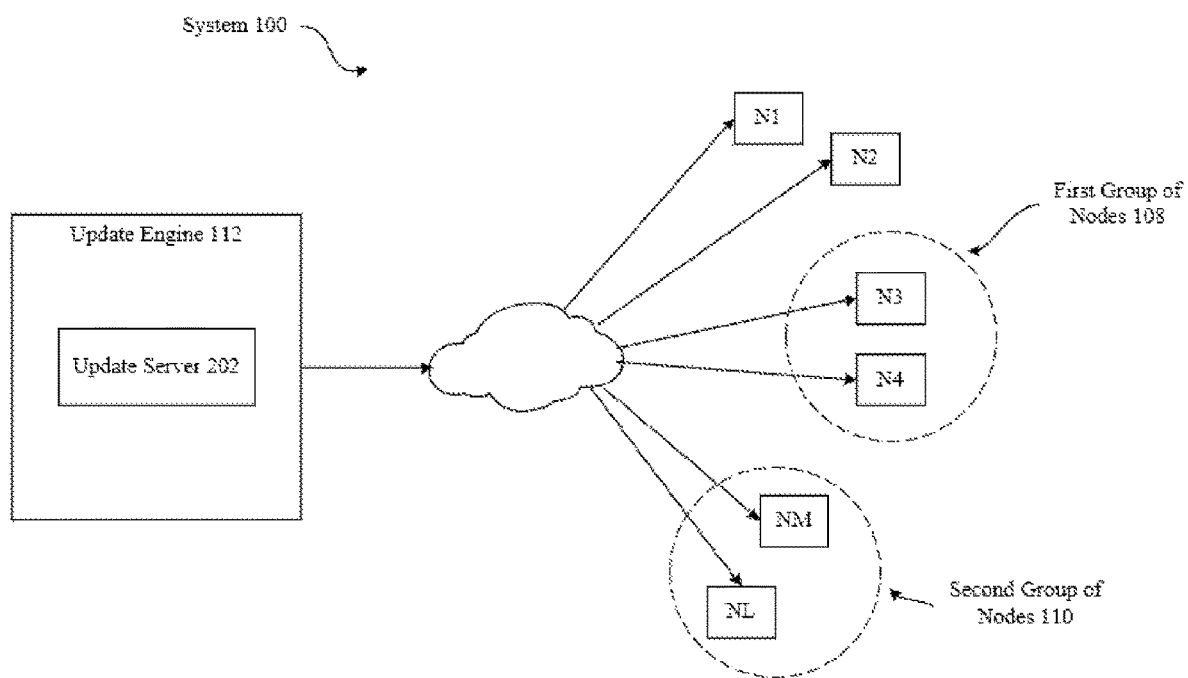
FIG. 1 illustrates a computing environment implementing a system, in accordance with one implementation of the present embodiment.

FIG. 1 illustrates a computing environment implementing a system 100, in accordance with one implementation of the present embodiment. This system comprises a computing environment where many computers are used to process and exchange information to handle multiple issues. System 100 can be implemented on various types of computing environment Examples include a personal computing environment, a time-sharing computing environment, a client, a server computing environment, a distributed computing environment, and a cloud computing environment.

The personal computing environment may include a single computer system having all the system processes available on the computer and executed there. Typical devices that constitute a personal computing environment include laptops, mobiles, printers, computer systems, and scanners. A time-sharing computing environment allows multiple users to share the system simultaneously. Each user is provided a time slice and the processor switches rapidly among the users so that it seems to each user that they are the only ones using the system. In client-server computing, the client requests a resource, and the server provides that resource. A server may serve multiple clients at the same time while a client is in contact with only one server. Both the client and server usually communicate via a computer network but sometimes they may reside in the same system.

The distributed computing environment may contain multiple nodes that are physically separate but linked together using the network. All the nodes in this system communicate with each other and handle processes in tandem. Each of these nodes contains a small part of the distributed operating system software. The cloud computing environment may include a cloud of computing devices where the cloud user can only see the service being provided and not the internal details of how the service is provided. This is done by pooling all the computer resources and then managing them using software. The clustered computing environment is created by two or more individual computer systems merged together which then work parallel to each other.

In any computing environment as described above, computing devices may be connected in a network having multiple software applications 208 installed to function with and operate peripheral devices. Such computing devices may be referred to as nodes or client nodes. A computing device, which can deploy, monitor, and control the applications 208 installed on the computing devices, hosts an update engine 112.

As illustrated in FIG. 1, one or more nodes are connected in a computing environment. In one example, N1, N2, N3, . . . . NL, NM nodes are connected in a distributed computing system. Each node may be installed with one or more applications 208 having software components or a combination of software components and hardware components.

The nodes, in one implementation, are in communication with the update engine 112 over a network 104 via one or more communication protocols. Examples of suitable protocols include Ethernet IEEE 802.3, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), or serial line Internet protocol/point to point protocol (SLIP/PPP). Customized or nonstandard interface protocols may also be implemented.

Figure 2:
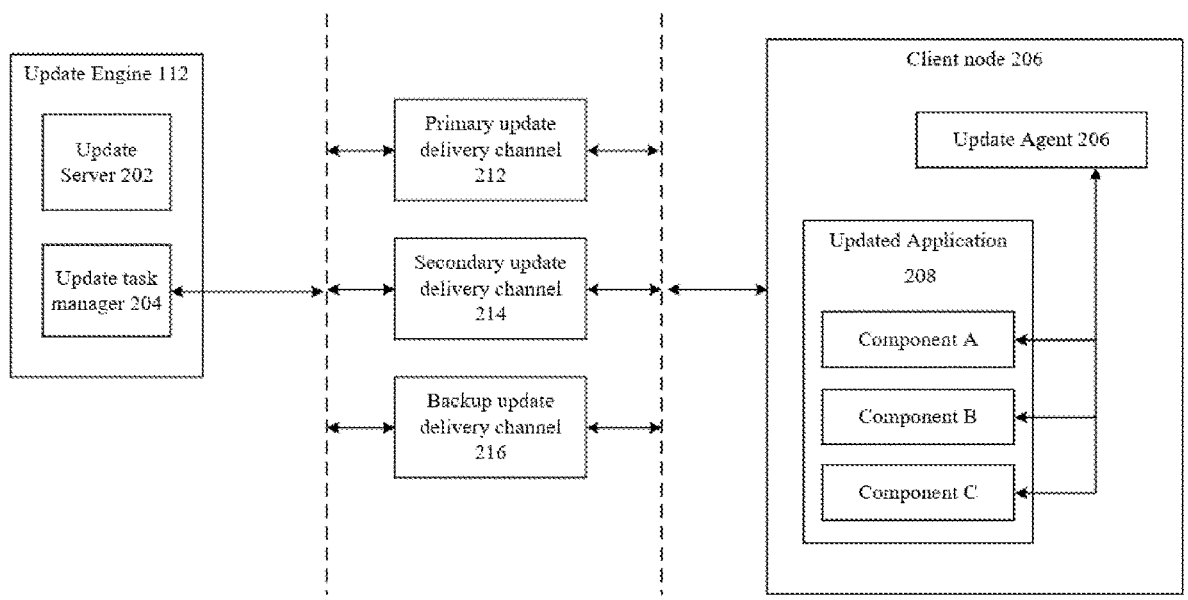
FIG. 2 illustrates a block diagram of the update engine, in accordance with one implementation of the present embodiment.

In one implementation, the update engine is a computing system, connected to one or more nodes, configured to install the applications 208 on the nodes and update the applications 208 as required. The update engine 112, described in detail with reference to FIG. 2, is implemented to monitor the applications 208, determine which applications 208 need software updates, and identify a first group of the nodes 108 from amongst all the nodes having the applications 208 that require software updates. The update engine 112 deploys updates to a first group of the nodes 108. After successful implementation of the updates on the first group of the nodes 108, the update engine 112 identifies a second group of nodes 110 for the next installation of the update. Thereby, the update engine 112 is configured to partially distribute the updates across the nodes in a sequential manner.

FIG. 2 shows a block diagram 200 of the update engine 112, in accordance with one implementation of the present embodiment. The update engine 112 comprises an update server and an update task manager. The components of the update engine 112 are interconnected to update the first group of the nodes 108 via at least one of a primary update delivery channel 212, a secondary update delivery channel 214, and a backup update delivery channel 216.

In one implementation, the update server is configured to identify nodes that require a software update and to create a group of the identified nodes. The automatic software update process may be initiated from the first group of the nodes 108. Once the automatic update is successfully installed on the first group of nodes 108, the update server identifies a second group of nodes 110, and so on. For example, as shown in FIG. 1, the first group of the nodes 108 N3 and N4. Once the software update task is successfully completed on the first group of the nodes 108, the node identifier 206 identifies a second group of nodes 110 that nodes NL and NM. Groups of nodes are formed until all the applications 208 are updated with the latest version of the software. In one implementation, each group of nodes contains a certain percentage of the nodes. The certain percentage may be predefined.

The update task manager, in accordance with one implementation, is implemented to generate an update task. The update task is a set of instructions and data related to the update to be installed. Specifically, in one implementation, the update task manager is configured to send an update request to an update agent 206 installed at each of the first group of the nodes 108. In one implementation, the update agent 206 is a module implemented to facilitate the update process at the client's node. The update agent 206 is in communication with the update task manager to receive the update task.

Each client node has a software application 208 that is able to be updated. The application 208 comprises one or more software components implemented to ensure enablement and functionality of application 208. Each software component is configured to perform different functionalities. Such components may be required to be updated individually.

The software components to receive an update should not be performing other tasks during the update installation. Therefore, the readiness of the software components for update is checked by the update agent 206 by sending a request notifying the software components about an impending update task. If the software components are ready to receive the update, the update agent 206 may initiate the update task installation. If the software components are performing any other task, the update agent may not initiate the update task installation. In one implementation, upon receiving readiness from a predefined quorum of software components, the update agent 206 may send the update task to the software components and update the software components through the primary update delivery channel 212. In one implementation, software components are updated by uninstalling previous versions and installing a new version of the software.

In one implementation, upon completion of the software update, the update completion status is sent to the update task manager 204 by the update agent.

In one implementation, the update task manager 204 is configured to collect the update task completion status from each node to determine if the update is successfully completed on the first group of nodes or not. In one implementation, the update agent 206 is configured to determine the total number of nodes that failed to update. If the number of failed nodes doesn't exceed a predefined threshold value, the update server creates a second group of nodes to send the update task. If the number of failed nodes exceeds the predefined threshold value, the update task manager terminates the update task. In one embodiment, the update server 202 is configured to create the second group of nodes 110 for update installation after the update of the first group of the nodes 108 is completed. Update task manager 204 is configured to perform sequential automatic updating of the applications 208 with distributing the updates on partial nodes at one instance and sending the updates to the rest of the nodes at the next instance.

In one implementation, update task manager 204 is further configured to calculate an error factor corresponding to the update task completion. If the error factor exceeds an error threshold, the update task is identified as invalid value and health errors associated with the nodes are eliminated.

In one implementation, the update task manager is further configured to resume the step of updating the application 208, if halted, after investigating and rectifying an error that caused the halt. There are various errors that may stop the updating process. These errors include, for example, broken connectivity, erroneous update delivery, and the like. The update task manager 204 investigates the cause of the halt and rectifies the error. In case of broken connectivity, a connection is activated by at least one node after a predefined time period. Then update agent 206 receives the instructions to resolve the problem that caused the connection failure from update task manager 204. Upon rectification, the update process is resumed from the point where it was halted. Furthermore, there are few critical operations where, if running on the applications 208, update task manager 204 does not initiate the update task but rather halts the update installation until the operations are performed. The operations may include, but may not be limited to backup, recovery, backup replication, VM replication, run-VM from image (including run VM finalization), convert to VM, DR failover, DR failback, script execution (for cyber scripting functionality), patch installation, SXi configuration backup, ESXi BMR recovery, and the like.

In one implementation, the update task manager 204 is further configured to remove at least one application 208, from the first group of the nodes 108, having disabled the auto-update feature. Users of the nodes are provided with the feature of disabling or restricting the automatic updates. In such instances, the nodes with disabled auto update features may be removed from the first group of the nodes 108 by the update server 202.

In one implementation, the update agent 206 is further configured to create a list of one or more update agents having disabled an auto-update feature, wherein a user of the node having disabled auto-update feature receives a notification about impending software update. In one implementation, if the update agent 206 fails to update the software components of the application 208 for a certain number of attempts in row, the update agent 206 may be deemed to have disabled the auto-update feature. In one example, if auto-update for a node fails 3 times in a row, the update agent 206 corresponding to the node will be added to the list. The maximum number of re-attempts is a configurable parameter that can be configured on a platform, such as an Acronis Cyber Cloud instance level. In one implementation, all the users of such nodes are notified about availability of the updates and requested to update the application 208 manually.

In one implementation, the update task manager 204 is further configured to enable defensive cyberspace operations (DCO) to determine if the list should be reset or not.

In one implementation, the update task manager 204 is configured to release a newer version of updates in response to release of a bad version of updates. It may happen that an erroneous version may be released as an update. In one example, the update task manager 204 may revoke the erroneous update and replace it with a newer version. In another example, the update task manager 204 may revoke the erroneous update and replace it with the older stable version.

In one implementation, the update task manager 204 is further configured to re-attempt the step of updating software after predetermined duration and for predetermined number of attempts if the step of updating software fails in a first attempt. For example, if the first attempt of the updating the software fails, the update task manager 204 may retry after X time duration. If the second attempt fails as well, the update task manager 204 may re-attempt the updating process after X time duration counted from the moment of second attempt failure and so on. The update task manager 204 may count the number of attempts and try to update the software for a predefined number of times. According to one implementation, the predefined duration and the predetermined number of attempts are a configurable parameter.

An update task is generally delivered to the nodes by the primary update delivery channel 212. But if the nodes are unresponsive to the update request made by update task manager 204, the update task manager 204 sends a secondary request using a secondary update delivery channel 214. The secondary requests, corresponding to update delivery, are sent to a node that is unresponsive to the primary request periodically, after a predefined time interval.

In one implementation, update task manager 204 may deliver critical updates via a backup update delivery channel 216 to the nodes.

The update task manager 204, in one implementation, is configured to track notifications, the health status of the nodes, or the progress of the updates. In one implementation, the update task manager 204 is configured to collect a notification from all the software components ensuring the readiness of all the software components to initiate updating. As the update server 202 identifies the first group of the nodes 108, the update task manager 204 sends the update task to the update agent 206 installed on each node of the first group of the nodes 108. The update agent receives the update task, and in response, sends an update request to all the software components corresponding to the node at which the update agent 206 is installed. The update request is a request to all software components to indicate their readiness to receive the software update. The update agent 206 may receive the notifications from each software component, indicating the readiness to receive the update. The notifications must ensure that at least a certain percentage of the nodes are ready to receive the update. In one implementation, the update agent 206 is further configured to send the collected notifications to the update task manager 204 to notify the readiness of the software components. If the predefined quorum of the ready software components is achieved, the update agent 206 releases the update task to update the software components. If the quorum is not achieved, the update agent 206 notifies the update task manager. In such an event, the update task manager reschedules the software update for later. The update is installed by uninstalling the previous version and installing a new version of the software on the software component of the application 208.

In one implementation, the update agent 206 is configured to send an update task completion status to the update task manager. The update agent 206, in another implementation, sends a notification to the update task manager 204 if the update task is aborted, and afterward, the update task manager 204 terminates the update task.

In one implementation, the update agent 206 is configured to determine a number of nodes that failed to complete the update task. If the number of failed nodes doesn't exceed a predefined threshold value, it is determined that the update task was successful for the first group of the nodes 108, and the update server 202 creates a second group of nodes 110 to receive the update task. The predefined threshold value is defined, for example, as the acceptable number of the nodes for which the update can be skipped. If the number of failed nodes exceeds the predefined threshold value, the update task manager 204 is configured to terminate the update task.

In accordance with one implementation, the update agent 206 is configured to monitor the progress of the update installation and display a progress report in percentage of the task completion on the node corresponding to the application 208.

In accordance with one implementation, the update agent 206 is configured to display the progress of the update task to the node in stages including pending current activities completion, downloading of the required packages associated with the update task, and installing the required packages.

In accordance with one implementation of the present embodiment, the update task manager 204 is configured to control the number of applications 208 being updated at specific instances. Further, the update task manager 204 is enabled to configure the maximum number of applications that can be updated at a given instance. For example, maximum simultaneously updated applications for Acronis Cyber Cloud instances can be 1000 applications. In one implementation, the update task manager 204 is configured to inspect a health status of update procedure by tracking a number of applications with update failure, and a number of applications with health status failure. Health status refers to the ability to check the health condition of the nodes periodically and on-demand. Node health indicates whether or not there are any warnings or errors that the services are aware of on that node. If the node has a node health value of Error, the node will not be able to accept the update request. In one example, the health status may be monitored by a service such as aakore.exe, a process that enables Acronis Agent Core Service.

In one implementation, the update task manager 204 is configured to skip an increment in a counter of applications with update failure if the current application 208 is updated successfully.

According to one implementation, the update task manager 204 is configured to define a failure ratio by Nf/max (N0,N), where N is a total number of applications those were attempted to update with the new version; Nf is a number of applications that failed to update, failure determined during installation or post-installation health-check; and NO is a positive integer value.

According to one implementation, the update task manager 204 is configured to terminate automatic installation of the update if the failure ratio exceeds a failure ratio threshold. The failure ration threshold may be a predefined value indicating acceptable number of failed updates. In one example, the value for failure ration threshold can be 0.005, considering NO set to 1000.

In one implementation, a Desired Configuration Management (DCM) alert (or equivalent) may be raised if the auto-update procedure is stopped. A user is optionally enabled to raise a ticket for escalating the issue to a service provider.

In one implementation, the update task manager 204 controls the maximum number of the applications getting updated. For example, Y % of the total number of the applications of the first group of the nodes 108 are updated in a predetermined time, for example 24 hours. The health status of each updated application 208 is monitored by the update task manager 204.

In one implementation of the present embodiment, update task manager 204 is configured to invoke an emergency update mode when the executable file facilitating the update task is unresponsive, for example, the aakore.exe service is dead, and the update agent 206 is no longer able to deliver the command to initiate the update. In one implementation, the update agent 206 is configured to monitor frequently and regularly, for example every 3 hours, to check if the emergency update is available by visiting the URL that is set to the application during its registration. In one implementation, the update agent 206 is configured to support a definition of the application scope to be updated. The applications may be selected by ID (either all applications or concrete application IDs) and an application 208 version, if there was an issue with one application 208 and the update engine 112 has to implement the emergency update mode for another version of the application while applications from previous versions are yet to be updated.

In one implementation, if an emergency update is available, the update agent 206 is configured to enforce a forced update. The forced update may be capable of repairing the application 208 and reinstalling all necessary components of the application 208. As a result of the force update, the application 208 may become functional, and the user able to manage the application 208 from the cloud console. In one example, the emergency update is initiated by the DCO who manages the instance of Acronis Cyber Cloud or R&D team.

Figure 3:
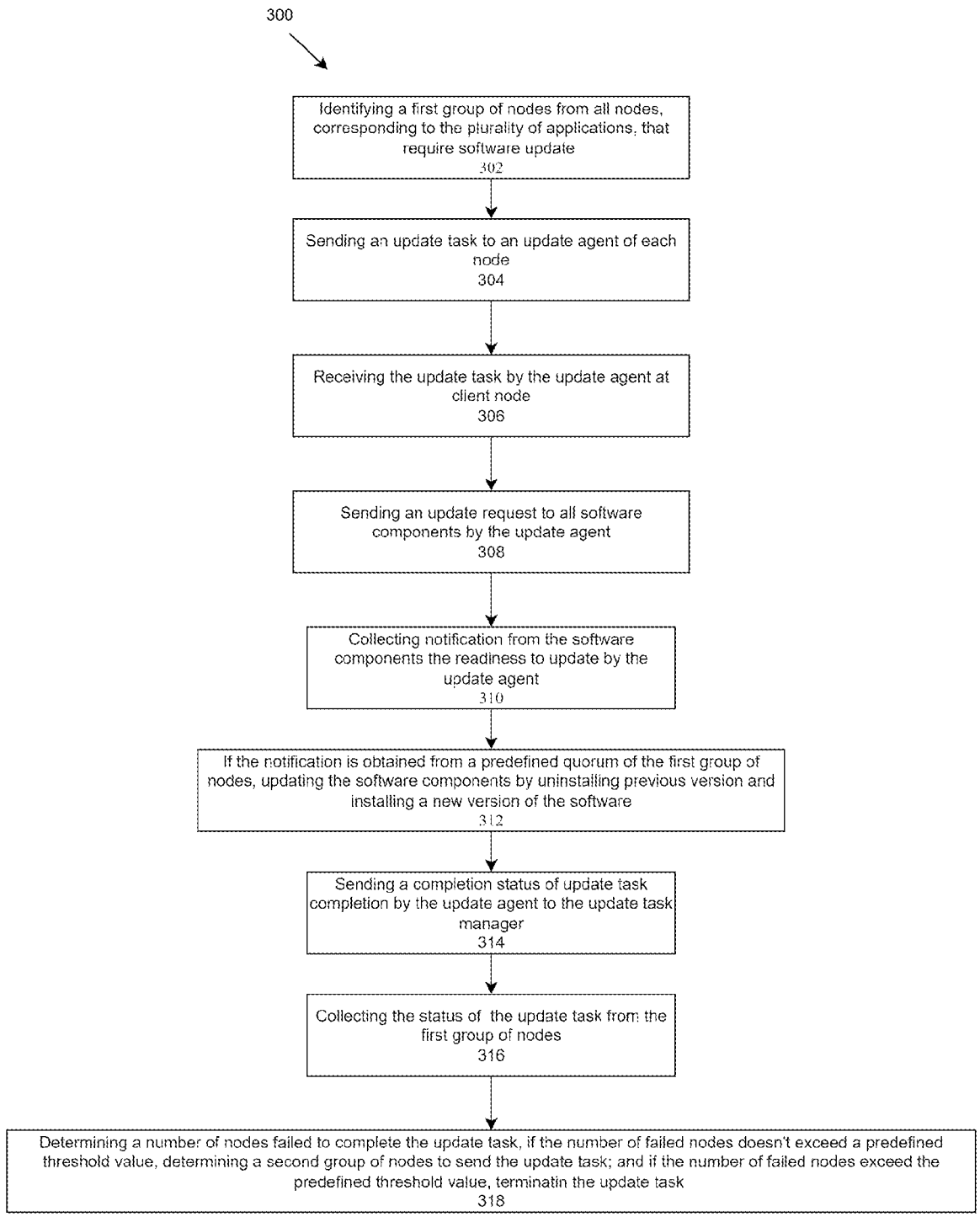
FIG. 3 is a method flow diagram of a method for updating the software applications, in accordance with one implementation of the present embodiment.

FIG. 3 shows method 300 for updating software applications. In an embodiment, method 300 may be implemented by primary update delivery channel 212.

At step 302, the method step comprises identifying, by an update server node identifier, a first group of nodes selected from all the nodes, corresponding to a plurality of applications that require a software update. The number of nodes of the first group of nodes is a predefined percent of all nodes.

At step 304, an update task manager sends an update task to an update agent 206 installed at each node of the first group of nodes.

At step 306, the update task is received by the update agent 206 at a node of the first group of the nodes.

At step 308, an update request is sent to all software components by the update agent.

At step 310, the method step comprises collecting, by an update agent 206, a notification from all the software components ensuring the readiness of all the software components to initiate updating.

At step 312, the software components of the application 208 are updated, upon receiving the notification from all the software components, by uninstalling a previous version and installing a new version of the software.

At step 314, completion status of an update task's completeness is sent by the update agent 206 to the update task manager.

At step 316, the status of the update task is collected from the first group of nodes to determine if the update has been completed successfully for the first group of nodes.

At step 318, the method step comprises determining, by the update agent 206, a number of nodes failed to complete the update task, if the number of failed nodes doesn't exceed a predefined threshold value, determining a second group of nodes 110 to send the update task by the update server 202, and if the number of failed nodes exceed the predefined threshold value, terminating the update task by the update task manager 204.

In some embodiments, method 300 comprises implementing the secondary update delivery channel 214 of FIG. 2 for periodically sending a secondary update request to the nodes that are not responding to the primary update request, for initiating the update tasks, and for implementing the backup update delivery channel 216 of FIG. 2 for delivering critical updates to the nodes.

In some embodiments, method 300 comprises distributing an update installation task among all or substantially all nodes and calculating an error factor. The update task is identified as invalid if the error factor exceeds an error threshold value and health attributes associated with the nodes are eliminated.

In embodiments, method 300 comprises steps of activating a connection from at least one node after predefined time period, if the connection from the update server to the at least one node is lost due to an update issue, and receiving, from the update server, instructions to resolve a problem that caused the connection failure.

In some embodiments, method 300 comprises re-attempting the step of updating software after predetermined duration and for predetermined number of attempts, if the step of updating software fails in a first attempt. In such cases, the predetermined duration and predetermined number of attempts are a configurable parameter.

In some embodiments, method 300 comprises controlling the number of applications being updated at specific instance, configuring a maximum number of applications that can be updated, and inspecting the health status of an update procedure by tracking a number of applications with update failure, and a number of applications with health status failure. The method further comprises restricting a counter of applications with update failure in response to update completion of the applications 208, defining an update failure ratio by Nf/max(N0,N), where N is total number applications 208 that had attempts to update them to the new version for particular installer that completed so far. Nf is number of applications 208 that failed to update (installation or post-installation health-check failure); N0 is a positive integer value; terminating automatic installation of the update if the failure ratio exceeds a failure ratio threshold.

In some embodiments, the method comprises resuming the step of updating application 208, if halted, after investigating and rectifying an error that caused the halt. The removing at least one application 208, from the first group of the nodes 108, having disabled the auto-update feature; creating a list of applications 208 having disabled auto-update feature, wherein a user of the application 208 having disabled auto-update feature receives a notification; and enable a decision-making component to instruct DCO to determine if the list should be reset or not.

In some embodiments, the method 300 comprises reporting and displaying the progress of the update task on the node corresponding to the application 208 in percentage of the task completion; displaying the progress in stages including pending current activities completion, downloading of the required packages associated with the update task, and installing the required packages.

In some embodiments, the method 300 comprises implementing an emergency backup mode in response to failure to receive health-check status from the application 208; configuring the update agent 206 to monitor availability of the emergency update with predetermined time interval; if the emergency update is available, initiating force update installation on the application 208; and repairing the applications 208 and reinstalling all software components associated with the application 208 by the force update.

The invention claimed is:

1. A computer-implemented method for updating a plurality of applications associated with software components in a computing environment that includes a plurality of nodes, the method comprising:
   providing at least one processor and memory operably coupled to the at least one processor;
   identifying a first group of nodes from all nodes, corresponding to a plurality of applications, that require software update, wherein a number of nodes of the first group of nodes defines a predefined percent of all nodes;
   sending an update task to an update agent installed at each node of the first group of nodes;
   updating software components of nodes from the first group of nodes by:
   receiving the update task by the update agent;
   sending an update request to all software components by the update agent;
   collecting, by the update agent, a notification from the software components about the readiness to update;
   updating the software components by uninstalling previous version and installing a new version of the software, the new version of the software executable in run-time by the at least one processor when the notification is obtained from a predefined quorum of the first group of nodes; and
   sending a completion status of update task completeness by the update agent to the update task manager;
   collecting the status of the update task from the first group of nodes determining when the update is completed successfully for the first group of nodes;
   determining a number of nodes that failed to complete the update task, when the number of failed nodes does not exceed a predefined threshold value,
   determining a second group of nodes to send the update task; and when the number of failed nodes exceed the predefined threshold value, terminating the update task;
   controlling number of applications being updated at specific instance;
   configuring a maximum number of applications that is able to be updated;
   inspecting a health status of an update procedure by tracking: the number of applications with update failure, and the number of applications with health status failure,
   restricting a counter of applications with update failure in response to update completion of the applications;
   defining an application update failure ratio; and
   terminating automatic installation of the update when the application update failure ratio exceeds a failure ratio threshold.

2. The computer-implemented method of claim 1 further comprising:
   a. implementing a secondary update delivery channel for periodically sending a secondary update request to the nodes, which are not responding to the primary update request, to initiate the update task, and
   b. implementing a backup update delivery channel for delivering critical updates to the nodes.

3. The computer-implemented method of claim 1 further comprising distributing an update installation task among all nodes and calculating an error factor, wherein the update task is identified as invalid when the error factor exceeds an error threshold value and health attributes associated with the nodes are eliminated.

4. The computer-implemented method of claim 1, wherein the updating software further comprises sequential automatic updating of the applications with partial distribution of the application.

5. The computer-implemented method of claim 1, further comprising:
   a. activating a connection from at least one node after a predefined time period when the connection from the update server to the at least one node is lost due to an update issue; and
   b. receiving, from the update server, instructions to resolve a problem that caused the connection failure.

6. The computer-implemented method of claim 1 further comprising re-attempting the updating software after predetermined duration and for a predetermined number of attempts, when the updating software fails in a first attempt, wherein the duration and predetermined number of attempts are a configurable parameter.

7. The computer-implemented method of claim 1, wherein the application update failure ratio is defined by Nf/max(NO,N), where N is total number applications that had attempts to update them to the new version for particular installer that completed; Nf is number of applications that failed to update; NO is a positive integer value.

8. The computer-implemented method of claim 1 further comprising:
   a. resuming the step of updating the application, when halted, after investigating and rectifying an error that caused the halt;
   b. removing at least one application, from the first group of nodes, having disabled the auto-update feature;
   c. creating a list of applications having disabled an auto-update feature, wherein a user of the application having disabled an auto-update feature receives a notification; and
   d. enabling a decision-making component to instruct defensive cyberspace operations (DCO) to determine when the list needs to be reset.

9. The computer-implemented method of claim 1 further comprising:
   a. reporting a progress of the update task to the nodes of the first group of nodes;
   b. displaying the progress of the update task on the nodes corresponding to the application in percentage of the task completion; and
   c. displaying the progress in stages including pending current activities completion, downloading of the required packages associated with the update task, and installing the required packages.

10. The computer-implemented method of claim 1, further comprising:
   a. implementing an emergency backup mode in response to failure to receive health-check status from the application;
   b. configuring the update agent to monitor availability of the emergency update with predetermined time interval;
   c. initiating force update installation on the application when the emergency update is available, and
   d. repairing the applications and reinstalling all software components associated with the application by the force update.

11. A system, to update a plurality of applications in a computing environment, comprising:
   at least one processor and memory operably coupled to the at least one processor, wherein the memory stores an update task manager and the at least one processor is configured to:
   identify a first group of nodes from all nodes, corresponding to the plurality of applications, that require software update, wherein a number of nodes of the first group of nodes is a predefined percent of all nodes;
   send an update task to an update agent installed at each node of the first group of nodes;
   the update agent operating on a client computing device and configured to:
      receive the update task from the update task manager;
      send an update request to all software components of each application;
      send an update task to the first group of nodes; and
      collect a notification from all the software components ensuring the readiness of all the software components to initiate updating;
      update the software components of the application when the notification is obtained from a predefined quorum of the first group of nodes by uninstalling previous version and installing a new version of the software, the new version of the software executable in run-time by the at least one processor;
      send an update task completion status to the update task manager; wherein the at least one processor is further configured to collect the status of the update task from the update agent and determine a number of nodes that failed to complete the update task;
   wherein the at least one processor is further configured to determine a second group of nodes to receive the update task
   when the number of failed nodes does not exceed a predefined threshold value; and wherein the at least one processor is configured to terminate the update task when the number of failed nodes exceeds the predefined threshold value;
   wherein the at least one processor is further configured to:
      control number of applications being updated at specific instance,
      configure a maximum number of applications that is able to be updated,
      inspect a health status of an update procedure by tracking: the number of applications with update failure, and the number of applications with health status failure,
      restrict a counter of applications with update failure in response to update completion of the applications,
      define a failure ratio, and
      terminate automatic installation of the update when the failure ratio exceeds a failure ratio threshold.

12. The system of claim 11, wherein a secondary update delivery channel is configured for periodically sending a secondary update request to the nodes, which are not responding to the primary update request, to initiate the update task.

13. The system of claim 11, wherein a backup update delivery channel is configured for delivering critical updates to the nodes.

14. The system of claim 11, wherein the at least one processor is further configured to calculate an error factor corresponding to the update task completion, and wherein, when the error factor exceeds an error threshold, the update task is identified as invalid value and health errors associated with the nodes are eliminated.

15. The system of claim 11, wherein the at least one processor is configured for sequential automatic updating of the applications with partial distribution of the applications.

16. The system of claim 11, wherein the update agent is configured to activate a connection from at least one node after predefined time period when the connection from the update server to the at least one node is lost due to an update issue, and further receive from the update server a set of instructions to resolve a problem that caused the connection failure.

17. The system of claim 11, wherein the at least one processor is further configured to re-send the update task after a predetermined time and for a predetermined number of attempts when the step of updating software fails in a first attempt, and wherein the predetermined time and predetermined number of attempts are a configurable parameter.

18. The system of claim 11, wherein the failure ratio is defined by Nf/max(NO,N), where N is total number applications that had attempts to update them to the new version for particular installer that completed, Nf is number of applications that failed to update, and NO is a positive integer value.

19. The system of claim 11, wherein the at least one processor is further configured to:
 a. resume the step of updating the application, when halted, after investigating and rectifying an error that caused the halt;
 b. remove at least one application, from the first group of nodes, having disabled the auto-update feature;
 c. create a list of applications having disabled auto-update feature, wherein a user of the application having disabled auto-update feature receives a notification; and
 d. enable a decision-making component to instruct defensive cyberspace operations (DCO) to determine when the list needs to be reset or not.

20. The system of claim 11, wherein the at least one processor is further configured to:
 e. report a progress of the update task to the node;
 f. display the progress of the update task in percentage of the task completion on the node corresponding to the application; and
 g. display the progress of the update task to the node in stages including pending current activities completion, downloading of the required packages associated with the update task, and installing the required packages.

\* \* \* \* \*